(12) United States Patent
Hara

(10) Patent No.: US 11,768,554 B2
(45) Date of Patent: *Sep. 26, 2023

(54) POSITION INDICATOR, POSITION DETECTING DEVICE, POSITION DETECTING CIRCUIT, AND POSITION DETECTING METHOD

(71) Applicant: Wacom Co., Ltd., Saitama (JP)

(72) Inventor: Hideyuki Hara, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 43 days.

This patent is subject to a terminal disclaimer.

(21) Appl. No.: 17/478,804

(22) Filed: Sep. 17, 2021

(65) Prior Publication Data

US 2022/0004301 A1    Jan. 6, 2022

Related U.S. Application Data

(63) Continuation of application No. 17/010,618, filed on Sep. 2, 2020, now Pat. No. 11,150,761, which is a
(Continued)

(51) Int. Cl.
  *G06F 3/041*    (2006.01)
  *G06F 3/046*    (2006.01)
  (Continued)

(52) U.S. Cl.
  CPC ...... *G06F 3/04162* (2019.05); *G06F 3/03545* (2013.01); *G06F 3/044* (2013.01);
  (Continued)

(58) Field of Classification Search
  CPC ............... G06F 3/03545; G06F 3/0416; G06F 3/04162; G06F 3/04166; G06F 3/0418; G06F 3/044; G06F 3/046
  See application file for complete search history.

(56) References Cited

U.S. PATENT DOCUMENTS 5,478,976 A   12/1995  Kano
5,699,084 A   12/1997  Fukuzaki
(Continued)

FOREIGN PATENT DOCUMENTS

CN    101714037 A    5/2010
CN    103401663 A    11/2013
(Continued)

OTHER PUBLICATIONS

Chinese Office Action, dated Feb. 19, 2020, for Chinese Application No. 201480073758.6, 16 pages.
(Continued)

*Primary Examiner* — Michael Pervan
(74) *Attorney, Agent, or Firm* — Seed IP Law Group LLP

(57) ABSTRACT

A signal transmission method is provided, which may be implemented by a position indicator. The signal transmission method includes a step of dividing first information, which is represented in a digital signal of a first defined number of bits, into a plurality of information parts respectively represented in digital signals of a second defined number of bits smaller than the first defined number of bits. The signal transmission method includes a step of transmitting, from the position indicator to a position detecting device, the information parts, and distinguishing information usable for distinguishing the information parts from each other, wherein each of the information parts is transmitted with second information different from the first information.

21 Claims, 7 Drawing Sheets

Related U.S. Application Data continuation of application No. 16/234,268, filed on Dec. 27, 2018, now Pat. No. 10,768,748, which is a continuation of application No. 15/209,547, filed on Jul. 13, 2016, now Pat. No. 10,209,829, which is a continuation of application No. PCT/JP2014/051296, filed on Jan. 22, 2014.

(51) Int. Cl.
*G06F 3/0354* (2013.01)
*G06F 3/044* (2006.01)

(52) U.S. Cl.
CPC ............ *G06F 3/046* (2013.01); *G06F 3/0416* (2013.01); *G06F 3/0418* (2013.01); *G06F 3/04166* (2019.05)

(56) References Cited

U.S. PATENT DOCUMENTS

| | | | |
|---|---|---|---|
| 5,729,251 A | 3/1998 | Nakashima | |
| 5,883,338 A | 3/1999 | Trunck et al. | |
| 6,441,810 B1 | 8/2002 | Skoog et al. | |
| 8,482,545 B2 | 7/2013 | King-Smith et al. | |
| 9,008,066 B2 | 4/2015 | Taghavi Nasrabadi et al. | |
| 9,483,129 B1 | 11/2016 | Holsen | |
| 9,495,011 B1 | 11/2016 | Lee et al. | |
| 9,658,720 B2 | 5/2017 | Kremin et al. | |
| 9,665,184 B2 | 5/2017 | Hara | |
| 9,703,433 B2 | 7/2017 | Chandran et al. | |
| 9,798,396 B2 | 10/2017 | Brunet et al. | |
| 10,031,597 B2 | 7/2018 | Kremin et al. | |
| 10,055,036 B2 | 8/2018 | Koike et al. | |
| 10,168,801 B2 | 1/2019 | Osada et al. | |
| 10,209,829 B2 | 2/2019 | Hara | |
| 10,296,106 B2 | 5/2019 | Hara | |
| 10,338,697 B2 | 7/2019 | Hara | |
| 10,444,870 B2 | 10/2019 | Kadowaki et al. | |
| 10,509,491 B2 | 12/2019 | Yamamoto | |
| 10,627,927 B2 | 4/2020 | Yamamoto | |
| 10,768,719 B2 | 9/2020 | Ju et al. | |
| 10,809,817 B2 | 10/2020 | Katsurahira et al. | |
| 10,861,323 B2 | 12/2020 | Yamamoto et al. | |
| 10,901,536 B2 | 1/2021 | Kadowaki et al. | |
| 10,942,598 B2 | 3/2021 | Koike et al. | |
| 10,943,388 B1 | 3/2021 | Hosenpud et al. | |
| 11,086,420 B2 | 8/2021 | Yamamoto | |
| 2003/0095115 A1 | 5/2003 | Brian et al. | |
| 2007/0227785 A1 | 10/2007 | Katsurahira | |
| 2008/0009289 A1 | 1/2008 | Kashima et al. | |
| 2008/0238885 A1 | 10/2008 | Zachut et al. | |
| 2010/0045636 A1 | 2/2010 | Noguchi et al. | |
| 2011/0007037 A1 | 1/2011 | Ogawa | |
| 2012/0068964 A1 | 3/2012 | Wright et al. | |
| 2012/0212366 A1 | 8/2012 | Alalusi | |
| 2012/0327040 A1 | 12/2012 | Simon et al. | |
| 2013/0088465 A1 | 4/2013 | Geller et al. | |
| 2013/0106718 A1 | 5/2013 | Sundara-Rajan | |
| 2013/0106767 A1 | 5/2013 | Shahparnia et al. | |
| 2013/0106797 A1 | 5/2013 | Pant et al. | |
| 2013/0207938 A1 | 8/2013 | Ryshtun et al. | |
| 2013/0335380 A1 | 12/2013 | Griffin et al. | |
| 2014/0002315 A1 | 1/2014 | Raffa et al. | |
| 2014/0002422 A1 | 1/2014 | Stern et al. | |
| 2014/0028598 A1 | 1/2014 | Yoo et al. | |
| 2014/0049478 A1 | 2/2014 | Brunet et al. | |
| 2014/0055553 A1 | 2/2014 | Lee et al. | |
| 2014/0078095 A1 | 3/2014 | Baranov et al. | |
| 2014/0104186 A1 | 4/2014 | Bakken et al. | |
| 2014/0168116 A1 | 6/2014 | Sasselli et al. | |
| 2014/0168177 A1 | 6/2014 | Mkrtchyan et al. | |
| 2014/0240298 A1 | 8/2014 | Stern | |
| 2014/0267121 A1 | 9/2014 | Luo | |
| 2014/0267147 A1 | 9/2014 | Buelow et al. | |
| 2015/0002415 A1 | 1/2015 | Lee et al. | |
| 2015/0054776 A1 | 2/2015 | Reitan et al. | |
| 2015/0145836 A1 | 5/2015 | Katsurahira | |
| 2015/0163772 A1 | 6/2015 | Ni et al. | |
| 2015/0193033 A1 | 7/2015 | Westhues | |
| 2015/0213281 A1 | 7/2015 | Tang et al. | |
| 2015/0338930 A1 | 11/2015 | Hara | |
| 2015/0346890 A1 | 12/2015 | Zachut | |
| 2015/0363012 A1 | 12/2015 | Sundara-Rajan et al. | |
| 2016/0048224 A1 | 2/2016 | Brunet et al. | |
| 2016/0048234 A1 | 2/2016 | Chandran et al. | |
| 2016/0054811 A1 | 2/2016 | Geller et al. | |
| 2016/0188016 A1 | 6/2016 | Munakata et al. | |
| 2016/0224136 A1 | 8/2016 | Kremin et al. | |
| 2016/0266663 A1 | 9/2016 | Holsen | |
| 2016/0282965 A1 | 9/2016 | Jensen et al. | |
| 2016/0306444 A1 | 10/2016 | Fleck | |
| 2016/0306447 A1 | 10/2016 | Fleck et al. | |
| 2016/0313812 A1 | 10/2016 | Katsurahira | |
| 2016/0320918 A1 | 11/2016 | Hara | |
| 2017/0060276 A1 | 3/2017 | Qiao et al. | |
| 2017/0097695 A1 | 4/2017 | Ribeiro et al. | |
| 2017/0123519 A1 | 5/2017 | Reitan et al. | |
| 2017/0147107 A1 | 5/2017 | Ishizaki et al. | |
| 2017/0262076 A1 | 9/2017 | Hara | |
| 2017/0269776 A1 | 9/2017 | Katsurahira | |
| 2018/0018031 A1 | 1/2018 | Fleck et al. | |
| 2018/0024654 A1 | 1/2018 | Koike et al. | |
| 2018/0024658 A1 | 1/2018 | Yamamoto et al. | |
| 2018/0088703 A1 | 3/2018 | Hua et al. | |
| 2018/0095495 A1 | 4/2018 | Katsurahira et al. | |
| 2018/0101250 A1 | 4/2018 | Katsurahira et al. | |
| 2018/0113519 A1 | 4/2018 | Yamamoto | |
| 2018/0113523 A1 | 4/2018 | Hara et al. | |
| 2018/0120962 A1 | 5/2018 | Hara et al. | |
| 2018/0120963 A1 | 5/2018 | Hara | |
| 2018/0129340 A1 | 5/2018 | Westhues et al. | |
| 2018/0157341 A1 | 6/2018 | Oda et al. | |
| 2018/0164904 A1 | 6/2018 | Qiao et al. | |
| 2018/0181212 A1 | 6/2018 | Miyazawa et al. | |
| 2018/0181222 A1 | 6/2018 | Ivanov | |
| 2018/0246585 A1 | 8/2018 | Hara | |
| 2018/0246587 A1 | 8/2018 | Dekel | |
| 2018/0356908 A1 | 12/2018 | Koike et al. | |
| 2019/0042009 A1 | 2/2019 | Kumar et al. | |
| 2019/0050109 A1 | 2/2019 | King-Smith et al. | |
| 2019/0050110 A1 | 2/2019 | King-Smith et al. | |
| 2019/0121489 A1 | 4/2019 | Fleck et al. | |
| 2019/0146602 A1 | 5/2019 | Kadowaki et al. | |
| 2020/0042114 A1 | 2/2020 | Kadowaki et al. | |
| 2020/0142508 A1 | 5/2020 | Yamamoto | |
| 2020/0225773 A1 | 7/2020 | Yamamoto et al. | |
| 2020/0401244 A1 | 12/2020 | Katsurahira et al. | |
| 2021/0074055 A1 | 3/2021 | Hosenpud et al. | |
| 2021/0110556 A1 | 4/2021 | Cohen et al. | |
| 2021/0149505 A1 | 5/2021 | Kadowaki et al. | |
| 2021/0183132 A1 | 6/2021 | Hosenpud et al. | |
| 2021/0191592 A1 | 6/2021 | Koike et al. | |
| 2021/0200377 A1 | 7/2021 | Hara et al. | |
| 2021/0216164 A1 | 7/2021 | Bao et al. | |

FOREIGN PATENT DOCUMENTS

| | | |
|---|---|---|
| JP | 8-221180 A | 8/1996 |
| JP | 8-234902 A | 9/1996 |
| JP | 2007-257359 A | 10/2007 |
| JP | 2011-086253 A | 4/2011 |
| TW | 297109 B | 2/1997 |
| TW | 451155 B | 8/2001 |

OTHER PUBLICATIONS

International Search Report, dated Mar. 25, 2014, for International Application No. PCT/JP2014/051296, 1 page.

POSITION INDICATOR, POSITION DETECTING DEVICE, POSITION DETECTING CIRCUIT, AND POSITION DETECTING METHOD

BACKGROUND

Technical Field

The present disclosure relates to a position indicator, and more particularly to a position indicator that transmits large-size information to a position detecting device. The present disclosure also relates to a position detecting device configured to detect the position of such a position indicator, a position detecting circuit for use by the position detecting device, and a position detecting method for detecting the position of such a position indicator.

Description of the Related Art

There exist touch-sensitive input systems configured to include a position detecting device that is a plate-like input unit, and a position indicator such as an electronic pen or a cursor. On some position detecting devices, a simple rod or a human fingertip may be used as the position indicator. Such input systems are usually called tablets or digitizers. They are utilized extensively for inputting texts and illustrations to computers such as personal computers and tablet terminals.

The position detecting device has a plurality of linear conductors (e.g., loop coils) arranged in a matrix pattern. The position detecting device is configured to detect the position of the position indicator on the basis of voltages or their variations generated by the linear conductors being approached by the position indicator.

Various specific schemes for position detection include the capacitance system and the electromagnetic induction system. The capacitance system involves using capacitance generated between the position indicator and linear conductors. The capacitance system may be further classified into the self-capacitance system that detects the change in voltage on each linear conductor, and the mutual capacitance system that detects the change in potential difference between the linear conductors intersecting with each other. The self-capacitance system may be still further classified into a system in which the position detecting device impresses a voltage to the linear conductors, and another system in which the position indicator transmits a signal to the linear conductors causing them to generate voltages. The former system may be employed where the position indicator cannot transit a signal as when the fingertip is used as the position indicator. The latter system may be utilized where the position indicator can transmit a signal. Meanwhile, the electromagnetic induction system is a system in which the position detecting device uses the linear conductors as a transmission antenna to transmit electromagnetic waves to the position indicator which in turn transmits a signal for detection by the position detecting device using the linear conductors as a receiving antenna. With the electromagnetic induction system, the transmission and the reception are performed on a time-sharing basis.

The detection of the position by the position detecting device is explained below using an example of the self-capacitance system in which the position indicator transmits a signal. With this system, the position detecting device detects the position while the position indicator keeps transmitting a determined continuous signal. During the transmission of the continuous signal by the position indicator, the linear conductors individually generate higher voltages the shorter their distance to the position indicator. The position detecting device individually scans a plurality of linear conductors for levels (voltages) to detect the linear conductor bearing the highest voltage among the conductors arranged in the X direction and the linear conductor carrying the highest voltage among the conductors arranged in the Y direction perpendicular to the X direction. The voltages of the two detected linear conductors and the voltages of nearby linear conductors are substituted in a determined mathematical formula, and the result calculated by the formula is acquired as the position of the position indicator. This calculating method allows the position of the position indicator to be detected with a resolution finer than the pitch at which the linear conductors are arranged.

Meanwhile, some of the position indicators capable of transmitting signals are configured to transmit not only the above-mentioned continuous signal but also various items of information. Specific examples of the information to be transmitted include writing pressure information, on-off information (side switch information) about switches typically provided on the side surface or the like of the position indicator, and an identifier (ID) unique to each position indicator. Patent Document 1 discloses a typical position detector that transmits such items of information to a position detecting device.

The transmitting of the diverse items of information from the position indicator and the transmitting of the continuous signal therefrom are performed on a time-sharing basis. An example disclosed in Patent Document 1 is cited here to give a specific description of the two kinds of transmitting on a time-sharing basis. The position indicator first transmits the continuous signal. During the continuous signal transmission, the position detecting device detects the position of the position indicator. Within a determined time of the completion of the continuous signal transmission, the position detecting device transmits a determined control signal (command) to the position indicator. Upon receipt of the control signal, the position indicator transmits information corresponding to the content of the control signal to the position detecting device. Although not described in Patent Document 1, there are cases where the position indicator transmits various items of information regardless of the control signal from the position detecting device.

PRIOR ART DOCUMENT

Patent Document

Patent Document 1: Japanese Patent Laid-open No. 2011-086253

BRIEF SUMMARY

Technical Problem

In recent years, the size of the information (bit count) transmitted from the position indicator to the position detecting device has increased considerably. For example, the ID unique to each position indicator includes such diverse items of information as the individual number, owner identification code, device type, and manufacturer number of the position indicator. The information, if it includes check bits, can amount to not less than 60 bits.

As described above, the transmitting of diverse items of information from the position indicator and the transmitting of the above-mentioned continuous signal for position detection are performed on a time-sharing basis. It follows that with a growing size of the transmitted information entailing a longer transmission time, the number of times the continuous signal is sent per unit time decreases. This means that there is a trade-off relation between the sampling rate of the position information and the amount of the information transmitted. An excessively large size of the transmission information may make it impossible for the operation of position detection to follow the rapid movement of the position indicator. For this reason, the existing input systems can transmit only up to a certain size of information from the position indicator to the position detecting device.

An embodiment facilitates a position indicator transmitting large-size information to a position detecting device without reducing the sampling rate of position information.

Technical Solution

According to an embodiment, there is provided a position indicator that transmits to a position detecting device a plurality of signal blocks successively, each of the signal blocks including a continuous signal for position detection and a first modulated signal acquired by modulating one of a plurality of divided information parts constituting first information. The position indicator transmits the entire first information by transmitting the plurality of signal blocks.

According to an embodiment, there is provided a position detecting device that receives from a position indicator a plurality of signal blocks successively, each of the signal blocks including a continuous signal for position detection and a first modulated signal acquired by modulating one of a plurality of divided information parts constituting first information. The position detecting device detects position information indicating the position of the position indicator from each of the signal blocks on the basis of the continuous signal, and acquires the first information on the basis of the first modulated signal included in each of the plurality of signal blocks.

According to an embodiment, there is provided a position detecting circuit connected to receiving circuitry. The position detecting circuit receives a plurality of signal blocks successively from a position indicator via the receiving circuitry, each of the signal blocks including a continuous signal for position detection and a first modulated signal acquired by modulating one of a plurality of divided information parts constituting first information. The position detecting circuit detects position information indicating the position of the position indicator from each of the signal blocks on the basis of the continuous signal, and acquires the first information on the basis of the first modulated signal included in each of the plurality of signal blocks.

According to an embodiment, there is provided a position detecting method including: a transmitting step of transmitting a plurality of signal blocks successively from a position indicator to a position detecting circuit, each of the signal blocks including a continuous signal for position detection and a first modulated signal acquired by modulating one of a plurality of divided information parts constituting first information; and a receiving step of receiving the plurality of signal blocks successively to detect position information indicating the position of the position indicator from each of the signal blocks on the basis of the continuous signal, while acquiring the first information on the basis of the first modulated signal included in each of the plurality of signal blocks.

Advantageous Effect

In an embodiment, the first information is divided into a plurality of signal blocks each including a continuous signal for position detection, before the signal blocks are transmitted. This facilitates the position indicator transmitting large-size information to the position detecting device without reducing the sampling rate of the position information.

In an embodiment, a position indicator comprises a housing; and circuitry, which, in operation, transmits a plurality of signal blocks successively to a position detecting device, each of the signal blocks including: a position detection signal; a first modulated signal acquired by modulating one part of a plurality of divided parts of position indicator identification information; and a second modulated signal acquired by modulating current position indicator status information acquired successively from a signal supplied to a control terminal or from a voltage state of the control terminal, wherein the position indicator transmits the plurality of divided parts of position indicator identification information by transmitting the plurality of signal blocks. In an embodiment, the first modulated signal includes information indicative of a position of the one of the plurality of divided parts in the position indicator identification information. In an embodiment, the first modulated signal includes an error-detecting code to detect an error in the one of the plurality of divided parts of the position indicator identification information. In an embodiment, each bit of the first and second modulated signals is transmitted in a clock cycle during which a signal level of the bit is at a first level for at least a portion of the clock cycle; and a signal level of the position detection signal remains at a second level different from the first level over a time period longer than the clock cycle. In an embodiment, a number of the plurality of divided parts of position indicator identification information is three. In an embodiment, the position indicator status information includes writing pressure information indicating a pressure sensed by the position indicator, and at least one of: side switch information indicating an on-off state of a switch provided on the position indicator; charging request information indicating whether the position indicator needs to be charged; tilt information indicating a tilt angle of the position indicator relative to the position detecting device; and rotation information acquired by a rotation sensor incorporated in the position indicator. In an embodiment, the position indicator comprises: a core body, which, in operation, contacts the position detecting device, wherein the writing pressure information is information acquired by detecting pressure applied to the core body while the position detection signal is in an active state.

In an embodiment, a position detecting device comprises: a sensor; and signal processing circuitry coupled to the sensor, wherein the signal processing circuitry, in operation, receives from a position indicator a plurality of signal blocks successively, each of the signal blocks including: a position detection signal; a first modulated signal acquired by modulating one part of a plurality of divided parts of position indicator identification information; and a second modulated signal acquired by modulating current position indicator status information acquired successively; and detects position information indicating the position of the position indicator from each of the signal blocks based on the position detection signal, acquires the current position indicator status information based on the second modulated signal, and acquires the one part of the position indicator identification information based on the first modulated signal. In an embodiment, the signal processing circuitry, in operation, acquires the plurality of divided parts of the position indicator identification information by receiving the plurality of signal blocks. In an embodiment, when the signal processing circuitry detects an error in acquisition of position indicator identification information, the signal processing circuitry continues to detect position information indicating the position of the position indicator based on the position detection signal and to acquire current position indicator status information based on the second modulated signal. In an embodiment, the first modulated signal includes information indicative of a position of the one of the plurality of divided parts in the position indicator identification information; and the signal processing circuitry, in operation, acquires the position indicator identification information by combining the respective parts included in each of the plurality of signal blocks based on the information indicative of the position of the respective parts included in each of the plurality of signal blocks. In an embodiment, the first modulated signal includes an error-detecting code to detect an error in the one part of the plurality of divided parts of the position indicator identification information; and for each of the signal blocks, the signal processing circuitry, in operation, determines whether the part of the position indicator identification information included in the first modulated signal associated with the signal block is accurate based on the error-detecting code included in the first modulated signal. In an embodiment, the signal processing circuitry, from a time when the plurality of signal blocks start being received until reception thereof is completed, retains a plurality of pieces of the position information acquired from the position detection signal included in each of the plurality of signal blocks, and a plurality of pieces of the current position indicator status information acquired from the second modulated signal included in each of the plurality of signal blocks. In an embodiment, when the signal processing circuitry successfully acquires the position indicator identification information from the plurality of signal blocks, the signal processing circuitry associates the retained pieces of the position information and the retained pieces of the current position indicator status information with the acquired position indicator identification information. In an embodiment, the signal processing circuitry, in operation, is coupled to a processor; and while the position indicator identification information is being acquired, the signal processing circuitry outputs to the processor each of the retained pieces of the position information and each of the retained pieces of the current position indicator status information. In an embodiment, the signal processing circuitry, in operation, is coupled to a processor; and the signal processing circuitry, in operation, associates the retained pieces of the position information and the retained pieces of the current position indicator status information with the acquired position indicator identification information before outputting the associated information to the processor.

In an embodiment, a system, comprises: receiving circuitry, which, in operation, receives a plurality of signal blocks successively from a position indicator, each of the signal blocks including: a position detection signal; a first modulated signal acquired by modulating one part of a plurality of divided parts of position indicator identification information; and a second modulated signal acquired by modulating current position indicator status information acquired; and position detecting circuitry, coupled to the receiving circuitry, wherein the position detecting circuitry detects position information indicating the position of the position indicator from each of the signal blocks based on the position detection signal, acquires the current position indicator status information based on the second modulated signal, and acquires the one part of the plurality of divided parts of the position indicator identification information based on the first modulated signal included in each of the plurality of signal blocks. In an embodiment, the first modulated signal includes information indicative of a position of the one of the plurality of divided parts in the position indicator identification information; and the position detecting circuitry, in operation, acquires the position indicator identification information by combining the respective parts included in each of the plurality of signal blocks based on the information indicative of the position of the respective part included in each of the plurality of signal blocks. In an embodiment, the first modulated signal includes an error-detecting code to detect an error in the one part of the plurality of divided parts of the position indicator identification information; and for each of the signal blocks, the position detecting circuitry, in operation, determines whether the part of the position indicator identification information included in the first modulated signal associated with the signal block is accurate based on the error-detecting code included in the first modulated signal. In an embodiment, from a time when the plurality of signal blocks start being received until reception thereof is completed, the position detecting circuitry, in operation, stores a plurality of pieces of the position information acquired from the position detection signal included in each of the plurality of signal blocks and a plurality of pieces of the current position indicator status information acquired from the second modulated signal included in each of the plurality of signal blocks in a storage circuit. In an embodiment, when the position detecting circuitry successfully acquires the position indicator identification information from the plurality of signal blocks, the position detecting circuitry associates the stored pieces of the position information in the storage circuit and the stored pieces of the current position indicator status information in the storage circuit with the acquired position indicator identification information. In an embodiment, the system comprises: a processor coupled to the position detecting circuitry, wherein the position detecting circuitry associates the stored pieces of the position information in the storage circuit and the stored pieces of the current position indicator status information in the storage circuit with the acquired position indicator identification information before outputting the associated information to the processor.

In an embodiment, a method comprises: transmitting a plurality of signal blocks successively from a position indicator to a position detecting circuit, each of the plurality of signal blocks including: a position detection signal for position detection; a first modulated signal acquired by modulating one part of a plurality of divided parts of position indicator identification information; and a second modulated signal acquired by modulating current position indicator status information acquired successively from a signal supplied to a control terminal or from a voltage state of the control terminal; receiving the plurality of signal blocks successively; detecting position information indicating the position of the position indicator from each of the received signal blocks based on the position detection signal; acquiring the current position indicator status information based on the second modulated signal from each of the signal blocks; and acquiring the plurality of divided parts of the position indicator identification information based on the first modulated signal included in each of the plurality of signal blocks.

DETAILED DESCRIPTION

Embodiments are described below in detail with reference to the accompanying drawings.

Figure 1:
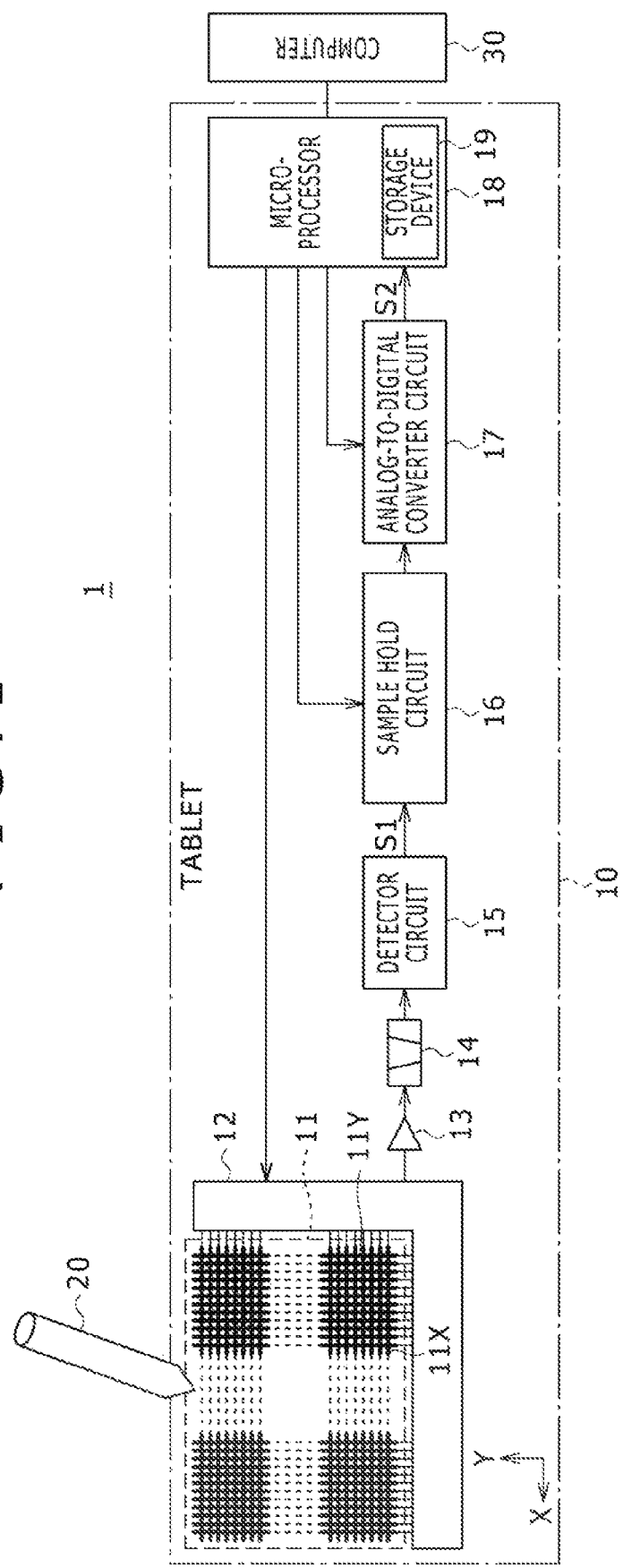
FIG. 1 is a block diagram illustrating a system configuration of a touch-sensitive input system 1 and functional blocks of a tablet 10 attached to the input system 1 of an embodiment.

A touch-sensitive input system 1 of an embodiment is configured to include a tablet 10 (position detecting device) having a plurality of electrodes (linear conductors) 11X and 11Y arranged in a matrix pattern, an electronic pen 20 (position indicator) designed to transmit a signal, and a computer 30 (processor) coupled to the tablet 10, as illustrated in FIG. 1.

The input system 1 is of the self-capacitance type. The tablet 10 is configured to detect the position of the electronic pen 20 on the basis of voltages generated by the electrodes 11X and 11Y receiving the signal transmitted from the electronic pen 20. In the ensuing paragraphs, the structure of the tablet 10 and that of the electronic pen 20 will be described first, followed by a description of the electronic pen 20 in operation and a description of the tablet 10 in operation, in that order.

As illustrated in FIG. 1, the tablet 10 is configured to include a tablet sensor 11, a selection circuit 12, an amplifier circuit 13, a band-pass filter 14, a detector circuit 15, a sample hold circuit 16, an analog-to-digital converter circuit 17, and a microprocessor 18 (position detecting circuit). Of these components, the tablet sensor 11, selection circuit 12, amplifier circuit 13, band-pass filter 14, detector circuit 15, sample hold circuit 16, and analog-to-digital converter circuit 17 function as the receiving circuitry for receiving signals from the electronic pen 20.

The tablet sensor 11 is configured to have a transparent glass substrate, not illustrated. The plurality of electrodes 11X extend in the X direction over the substrate surface (the face close to the electronic pen 20) and are arranged an equal distance apart from each other in the Y direction perpendicular to the X direction. The plurality of electrodes 11Y extend in the Y direction over the back side of the substrate (the face away from the electronic pen 20) and are arranged an equal distance apart from each other in the X direction. The electrodes 11X and 11Y are transparent conductors. The electrodes may be formed of indium tin oxide (ITO), for example. In an embodiment, as many as 30 electrodes 11X and 40 electrodes 11Y may be provided.

The tablet sensor 11 is disposed on a display device, not illustrated. Since the tablet sensor 11 is formed of the above-mentioned transparent members, an image displayed on the display device is transmitted through the tablet sensor 11 and is visible by the user of the input system 1. In this manner, the input system 1 allows the user to experience writing with the electronic pen 20 on the image displayed on the display device.

From an opposite point of view, it is because the tablet sensor 11 is disposed on the display device that the tablet sensor 11 is formed of the transparent members. An embodiment may also be applied to tablets that have no display area. In this case, the tablet sensor 11 need not be formed of transparent members. That means the tablet sensor 11 may comprise, for example, copper wires instead of ITO.

The selection circuit 12 selects one of the electrodes 11X and 11Y and couples the selected electrode to the amplifier circuit 13. The amplifier circuit 13 is supplied with the voltage of the electrode selected by the selection circuit 12. As will be explained later in more detail, the electronic pen 20 is configured to amplitude-modulate a sine wave signal of a determined frequency using the transmission information. On each of the electrodes 11X and 11Y develops a voltage signal reflecting the amplitude of the sine wave signal thus transmitted.

The amplifier circuit 13 amplifies the voltage signal supplied from the selection circuit 12 and outputs an amplified voltage signal to the band-pass filter 14. The band-pass filter 14 extracts only the component of the above-mentioned determined frequency from the voltage signal output from the amplifier circuit 13, and outputs the extracted component to the detector circuit 15. The detector circuit 15 generates an envelope signal S1 by envelope-detecting the voltage signal output from the band-pass filter 14, and outputs the generated envelope signal S1 to the sample hold circuit 16. The sample hold circuit 16 performs the sample and the hold operations a determined time apart on the envelope signal S1 output from the detector circuit 15. The analog-to-digital converter circuit 17 generates a digital signal S2 by subjecting to analog-to-digital conversion the signal being held by the sample hold circuit 16, and outputs the generated digital signal S2 to the microprocessor 18.

The electronic pen 20 transmits signals through binary amplitude shift keying (ASK), as will be described later. The analog-to-digital converter circuit 17 assumes that the input signal was modulated through multi-value ASK when converting the input signal to the digital signal S2. This process is intended to let the microprocessor 18 acquire an approximate value of the voltage represented by the voltage signal output from the selector circuit 12.

The microprocessor 18 is a processor that incorporates a storage device 19 and operates on programs held in the storage device 19. The storage device 19 includes a read only memory (ROM) and a random access memory (RAM), for example. The operations performed by the microprocessor 18 include controlling the selector circuit 12, sample hold circuit 16, and analog-to-digital converter circuit 17; and causing the storage device 19 temporarily to store the information represented by the digital signal S2 supplied from the analog-to-digital converter circuit 17 before outputting the information to the computer 30 at a suitable timing.

Figure 2A:
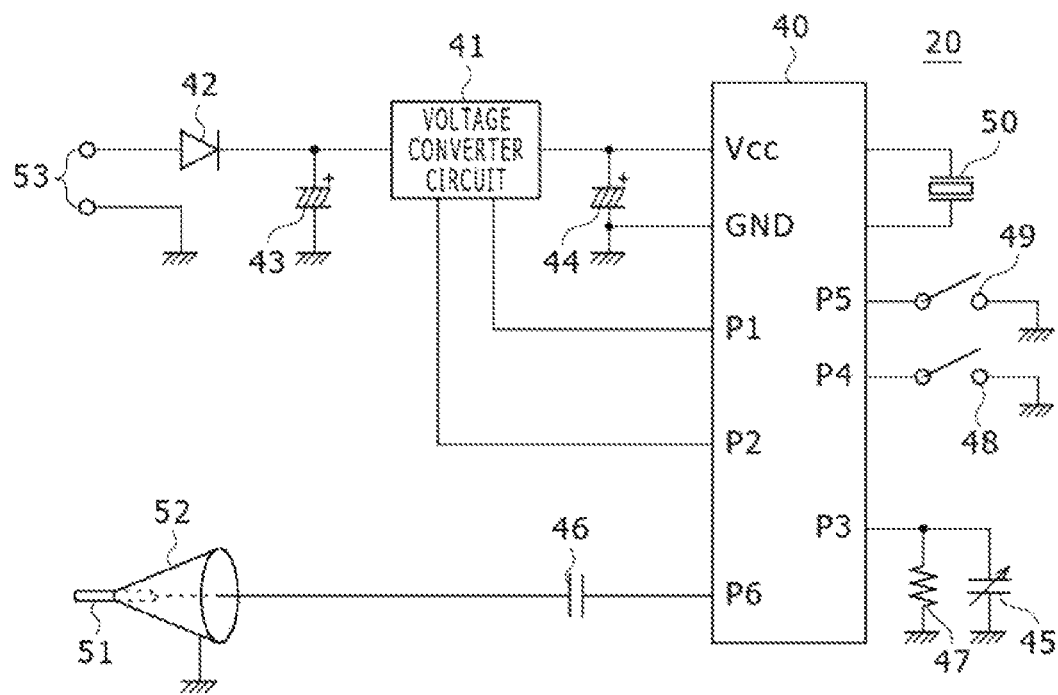
FIG. 2A is a circuit diagram illustrating examples of an internal circuit of an electronic pen 20 indicated in FIG. 1

As illustrated in FIG. 2A, the electronic pen 20 is configured to have a controller 40, a voltage converter circuit 41, a diode 42, capacitors 43 to 46, a resistive element 47, switches 48 and 49, a vibrator or oscillator 50, a conductor core 51 (core body), a tip conductor 52, and a charging terminal 53.

The controller 40 is a processor that includes a ROM and a RAM. The controller 40 is configured to operate in synchronism with a clock signal generated by the vibrator 50 and in conformity with the description of programs stored in the ROM. The cycle of the clock signal is 60 microseconds for example. In addition to the terminals connected to the vibrator 50, the controller 40 has a power supply terminal Vcc, a ground terminal GND, and control terminals P1 to P6.

The power supply terminal Vcc is connected with the capacitor 43 via the voltage converter circuit 41. The capacitor 43 is an electric double layer capacitor that serves as the power source of the electronic pen 20. The capacitor 43 is configured to have its anode connected to the input terminal of the voltage converter circuit 41, with the cathode of the capacitor 43 being grounded. The voltage converter circuit 41 is a direct current-to-direct current (DCDC) converter acting to convert the voltage across the capacitor 43 to a rated voltage of the controller 40.

Although this embodiment uses an electric double layer capacitor as the power source, this is not limitative. Alternatively, other power configurations may be employed, such as a primary battery such as a lithium battery or a dry cell, or a secondary battery such as a nickel-hydrogen storage cell may be used as the power source.

The anode of the capacitor 43 is also connected to the charging terminal 53 via the diode 42. The charging terminal 53 is made up of two terminals: a positive terminal and a negative terminal. The anode of the capacitor 43 is connected with the positive terminal of the charging terminal 53. The negative terminal is grounded inside the electronic pen 20. The charging terminal 53 is a terminal to which an external power supply unit is connected. When the external power supply unit is connected to the charging terminal 53, the capacitor 43 is charged. In an embodiment, a dedicated battery charger (not illustrated) of the electronic pen 20 is used as the external power supply unit.

The capacitor 44 is connected interposingly between the power supply terminal Vcc and the ground terminal GND. The capacitor 44 is provided to stabilize the power supply voltage fed from the voltage converter circuit 41 to the controller 40. In an embodiment, the capacitor 44 is an aluminum electrolytic capacitor of from tens to hundreds of μF for example.

The voltage converter circuit 41 is configured to perform either step-down operation or step-up operation in accordance with the voltage across the capacitor 43. That is, the maximum voltage across the capacitor 43 is designed to exceed the rated voltage of the controller 40. It follows that while the capacitor 43 is being fully charged, the voltage across the capacitor 43 exceeds the rated voltage of the controller 40. In this case, the voltage converter circuit 41 performs step-down operation to bring the voltage supplied to the power supply terminal Vcc down to the rated voltage of the controller 40. On the other hand, if the capacitor 43 is insufficiently charged, the voltage across the capacitor 43 may fall below the rated voltage of the controller 40. In this case, the voltage converter circuit 41 performs step-up operation to bring the voltage supplied to the power supply terminal Vcc up to the rated voltage of the controller 40.

The voltage converter circuit 41 is also connected to the control terminals P1 and P2 of the controller 40. When the controller 40 supplies a determined control signal to the voltage converter circuit 41 via the control terminal P1, the voltage converter circuit 41 detects the voltage across the capacitor 43 and outputs to the control terminal P2 a signal representing the detected voltage value. The controller 40 is configured, given the signal thus supplied, to determine whether or not the capacitor 43 needs to be charged.

The input system 1 has the function of notifying the user of an insufficiently charged state of the capacitor 43. What follows is a more specific explanation of this function. The controller 40 is configured to transmit to the tablet 10 a signal representing the result of the determination of whether or not the capacitor 43 needs to be charged (a specific method of transmitting the signal will be discussed later). The computer 30 receives the signal via the tablet 10. If the signal indicates the need to charge the capacitor 43, an indication to that effect is displayed typically on a display device, not illustrated. The indication allows the user to know the need for charging the electronic pen 20. Given the indication, the user places the electronic pen 20 on the above-mentioned battery charger to start charging the capacitor 43.

The control terminal P3 is grounded via the capacitor 45 and the resistive element 47. The capacitor 45 is a variable capacitance capacitor coupled to the conductor core 51, and is configured to vary in capacitance depending on the pressing force (writing pressure) in effect when the electronic pen 20 is pressed against the tablet 10. The controller 40 is configured to acquire the writing pressure from the capacitance of the capacitor 45, as will be discussed later in more detail.

The method of detecting the pressing force (writing pressure) is not limited to the use of a variable capacitance capacitor as described above. The electronic pen 20 may be configured to detect the pressing force (writing pressure) using other methods. For example, an alternative method may involve detecting the pressing force in terms of changes in inductance of plurality of ferrite cores being moved. Another method may involve using semiconductor devices, namely micro electro mechanical systems (MEMS) to detect the pressing force. Still another method may involve optically detecting the pressing force.

The control terminals P4 and P5 are grounded via the switches 48 and 49, respectively. The switches 48 and 49 are disposed on the surface of the electronic pen 20 (side switches) and are operable by the user. The controller 40 has the function of determining the on-off states of the switches 48 and 49 from the voltage states of the control terminals P4 and P5. Although this embodiment has two switches 48 and 49, there may be provided no switch, one switch, or three or more switches instead.

The control terminal P6 is coupled to the conductor core 51 via the capacitor 46. The conductor core 51 is structured to protrude from the tip conductor 52 at the tip of the housing of the electronic pen 20. The tip conductor 52 is grounded.

The electronic pen 20 has the function of transmitting an amplitude-modulated sine wave signal of a determined frequency, as mentioned above. This sine wave signal is generated by the controller 40. The controller 40 is configured to output the sine wave signal from the control terminal P6. The sine wave signal thus output is fed to the conductor core 51 via the capacitor 46. Note that the capacitor 46 is provided to remove the direct-current bias component from the sine wave signal. The sine wave signal reaching the conductor core 51 is output as electromagnetic waves and received by the electrodes 11X and 11Y of the tablet 10 as discussed above.

The structure of examples of the tablet 10 and that of the electronic pen 20 were explained above. What follows is an explanation of example content of the information sent from the electronic pen 20 to the tablet 10, followed by an explanation of an example transmission operation performed by the electronic pen 20.

Figure 2B:
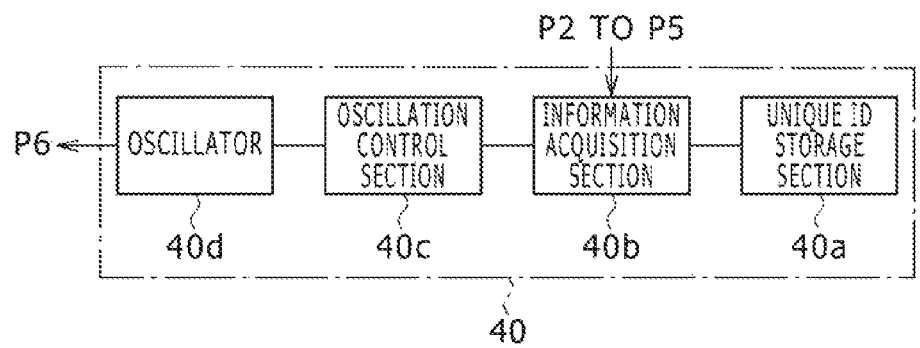
FIG. 2B is a schematic block diagram illustrating functional blocks of a controller 40 indicated in FIG. 2A.

As illustrated in FIG. 2B, the controller 40 of the electronic pen 20 is functionally configured to have a unique ID storage section or circuitry 40*a*, an information acquisition section or circuitry 40*b*, an oscillation control section or circuitry 40*c*, and an oscillator 40*d*.

The unique ID storage section 40*a* stores a unique ID given beforehand to the electronic pen 20. The unique ID is information unique to this electronic pen 20 and is different from the ID assigned to any other electronic pen 20. For example, the unique ID is structured to include or indicate the individual number of the electronic pen 20, the owner identification code (e.g., user ID assigned to the electronic pen owner) of the electronic pen 20, and the type and the manufacturer number of the electronic pen 20. The unique ID may be 51 bits in size, for example.

The information acquisition section 40*b* is configured to acquire the unique ID from the unique ID storage section 40*a* and to also acquire other diverse information from the signals supplied to the above-mentioned control terminals P2 to P5 or from their voltage states. What follows is an explanation of various examples of items of information that may be acquired by the information acquisition section 40*b* through the control terminals.

The control terminal P2 is supplied with the signal representing the voltage across the capacitor 43 as described above. On the basis of this signal, the information acquisition section 40*b* determines whether or not the capacitor 43 needs to be charged, and generates charging request information indicating the result of the determination. The charging request information is, for example, one-bit information that is 1 when charging is needed and 0 when charging is not needed.

Figure 3A:
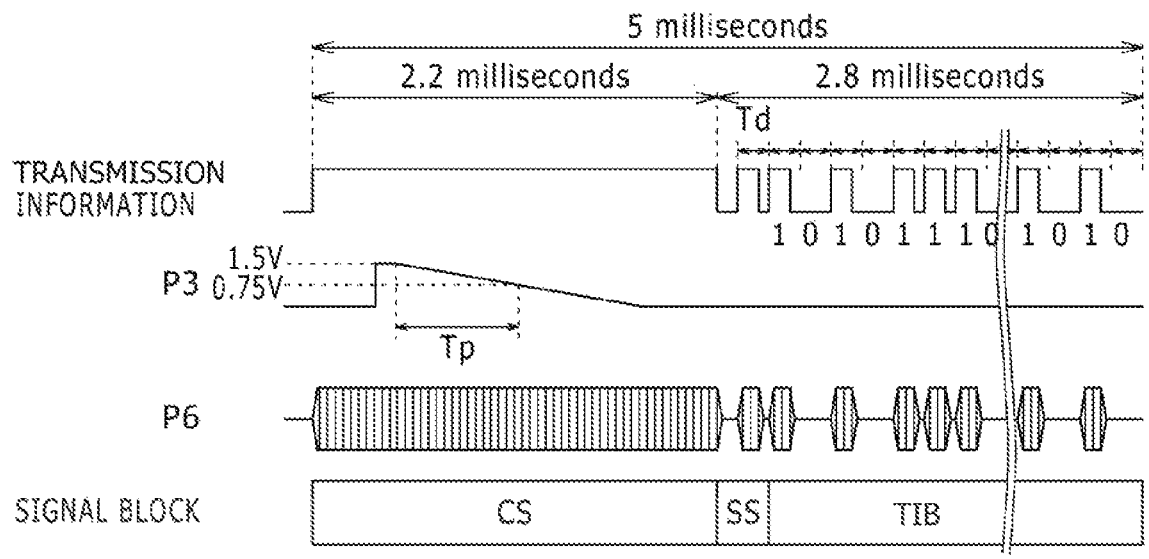
FIG. 3A is a timing chart illustrating various examples of signals related to the electronic pen 20 indicated in FIG. 2A

The information acquisition section 40*b* is also configured to acquire writing pressure information representing the above-mentioned writing pressure from the voltage state of the control terminal P3. FIG. 3A illustrates example changes in the voltage state of the control terminal P3 in effect when the writing pressure information is acquired. As illustrated in the figure, the writing pressure information is acquired while a continuous signal CS for position detection is being sent.

More specifically, the information acquisition section 40*b* references the potential on the control terminal P3 as the power supply potential over a determined time period after the electronic pen 20 has started to transmit the continuous signal CS. The power supply potential is 1.5 V, for example. This operation is intended to detect the writing pressure in effect at that point in time. That is, the operation causes the capacitor 45 to accumulate the charges of which the amount varies depending on the capacitance of the capacitor 45 in effect at the time. Since the capacitance of the capacitor 45 varies with the writing pressure as described above, the amount of the charges accumulated in the capacitor 45 reflects the writing pressure.

The information acquisition section 40*b* then places the control terminal P3 in the high-impedance state. This causes the capacitor 45 to discharge the accumulated charges through the resistive element 47. The information acquisition section 40*b* measures an elapsed time Tp from the time the capacitor 45 starts being discharged until the potential of the control terminal P3 reaches 0.75 V, half the power supply potential of 1.5 V. The larger the capacitance of the capacitor 45, the longer the elapsed time Tp thus measured. The information acquisition section 40*b* can thus acquire the writing pressure information from the measured elapsed time Tp. The writing pressure information acquired in this manner is 10 to 12 bits in size.

The information acquisition section 40*b* further generates side switch information representing the on-off states of the switches 48 and 49 from the voltage states of the control terminals P4 and P5. Since this embodiment has two switches, the side switch information is 2 bits in size.

The information acquisition section 40*b* supplies the oscillation control section 40*c* with the diverse information thus acquired (e.g., unique ID, charging request information, writing pressure information, and side switch information). The information acquisition section 40*b* may also acquire information other than the information described above and feed such information to the oscillation control section 40*c*. The other information may include tilt information representing the tilt angle of the electronic pen 20 relative to the tablet 10, fingerprint information acquired by a fingerprint sensor incorporated in the electronic pen 20, grip strength information acquired by a pressure sensor incorporated in the electronic pen 20, rotation information acquired by a rotation sensor incorporated in the electronic pen 20, and power supply state information indicative of the charged state of the power source, for example.

The oscillation control section 40*c* is a circuit that controls the oscillator 40*d* in operation to output to the oscillator 40*d* a signal modulated through binary ASK. The oscillator 40*d* is configured to generate a sine wave signal of a determined frequency and to output the generated sine wave signal to the control terminal P6. The output of the signal from the oscillator 40*d* is turned on or off under control of the oscillation control section 40*c* on the basis of the diverse information supplied from the information acquisition section 40*b*, for example. As a result of this, the signal output from the control terminal P6 is modulated through binary ASK, as illustrated in FIG. 3A. The oscillator 40*d* of this embodiment is configured to operate in synchronism with the clock signal generated by the vibrator 50. Alternatively, the oscillator 40*d* may be configured to oscillate at another frequency without synchronizing with the clock signal. In such a case, the oscillator 40*d* may be disposed outside the controller 40 in a position connected to the control terminal P6.

Although this embodiment utilizes binary ASK, other modulation methods may obviously be used instead. For example, another type of amplitude modulation such as multi-value ASK, frequency shift keying, phase shift keying, or quadrature amplitude modulation may be adopted alternatively.

Described below in detail with reference to FIGS. 3A, 4A, 4B and 5 is an example transmission operation performed by the electronic pen 20 using the oscillation control section 40*c* and the oscillator 40*d*.

The oscillation control section 40*c* and the oscillator 40*d* are configured to transmit signals successively in units of a signal block. FIG. 3A illustrates an example of the signal block. In the example of FIG. 3A, one signal block is assigned a time period of 5 milliseconds. The first-half time period of 2.2 milliseconds is assigned to transmitting the continuous signal CS for position detection. The above-described diverse information is transmitted by use of the second-half time period of 2.8 milliseconds.

In the example of FIG. 3A, the position information is detected every 5 milliseconds by the tablet 10. If position information detection is performed at a frequency in this range, the phenomenon of the computer 30 being unable to give display fast enough to keep up with the rapid movement of the electronic pen 20 does not usually happen.

On the other hand, in the example of FIG. 3A, it is impossible to transmit an entire unique ID in a single signal block. That is, the oscillation control section 40c of this embodiment is configured to operate at a single rate regarding the clock signal (one cycle Td=60 microseconds) generated by the vibrator 50 illustrated in FIG. 2A, as well as to perform modulation through binary ASK as discussed above. Thus the amount of information that can be transmitted in 2.8 milliseconds is merely up to 46 bits (2.8/0.06≈46.7). Considering the time required to transmit a start signal SS, to be described later, the amount of the information that can be actually sent drops further to approximately 43 bits. It follows that if the unique ID is 51-bit information as mentioned above, the entire unique ID cannot be sent in a single signal block.

The second-half portion of the signal block is explained more specifically below. As illustrated in FIG. 3A, the second half of the signal block includes a start signal SS and a transmission information block TIB. The start signal SS is a known signal notifying the tablet 10 that the transmission of the continuous signal CS is completed. The start signal SS signal is transmitted following the continuous signal CS. The transmission information block TIB is structured with a signal modulated on the basis of the diverse information acquired by the information acquisition section 40b.

Figure 3B:
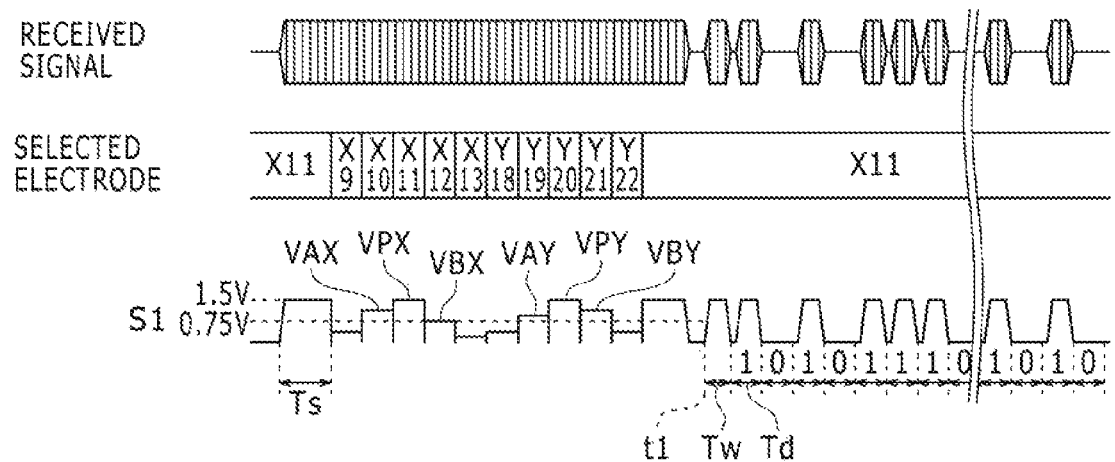
FIG. 3B is a timing chart illustrating various signals related to the tablet 10 indicated in FIG. 1.

Here, the oscillation control section 40c provides on-off control of the output of the oscillator 40d based on the transmission information in synchronism with the rising edges of the clock signal generated by the vibrator 50 illustrated in FIG. 2A, and turns off the output of the oscillator 40d in synchronism with the falling edges of the clock signal. This fixes to 0 the amplitude of the transmitted signal in the second half of one clock cycle. As a result, the signal involving the transmission information block TIB is an intermittent signal that always includes a low level (first level) period at intervals of one clock cycle as illustrated in FIG. 3B. This structure is adopted so that the continuous signal CS for position detection (a signal that remains at the high level (second level) over a period longer than one clock cycle) and the transmission information block TIB will be clearly distinguished from each other.

The internal structure of the transmission information block TIB is explained below in more detail. The program that regulates the operation of the oscillation control section 40c categorizes beforehand each of the various items of information acquired by the information acquisition block 40b into one of two types: the type of information that can be transmitted in one transmission information block TIB, and the type of information that cannot be transmitted in one transmission information block TIB. The former type of information will be referred to as the second information and the latter type of information as the first information hereunder. With this embodiment, the unique ID is categorized as the first information, and other items of information (charging request information, writing pressure information, and side switch information) are categorized as the second information. Of the other items of information mentioned above, e.g., tilt information, fingerprint information, grip strength information, and rotation information, the fingerprint information and the grip strength information may be categorized as the first information because of their relatively large sizes, and the rotation information may be categorized as the second information because of its relatively small size. The tilt information may be categorized as the first information if its size is large and as the second information if its size is small.

Figure 4A:
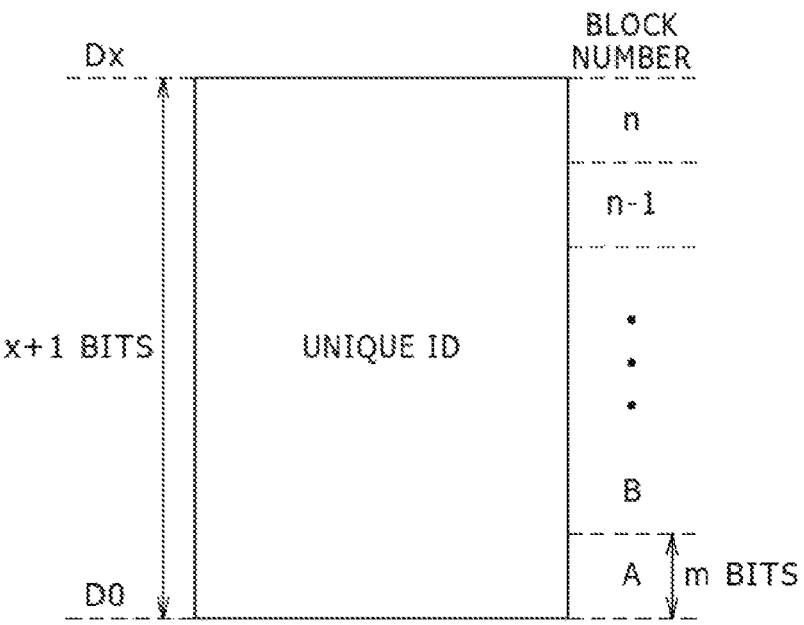
FIG. 4A is a schematic view illustrating an example structure of a unique ID stored in a unique ID storage section 40a indicated in FIG. 2B

The oscillation control section 40c has the function of dividing the first information into a plurality of information parts. FIG. 4A illustrates an example of the unique ID as the first information. In this example, the oscillation control section 40c divides the unique ID, which is made up of bits D0 to Dx having x+1-bit information, into as many as n ID blocks (information parts) each having m bits. At the time of dividing, the oscillation control section 40c provides each information part with a division number (division information) indicating the position of that information part inside the first information. In the example of FIG. 4A, the oscillation control section 40c provides the ID blocks with block numbers A, B, . . . , n−1, n serving as the division numbers. Where the unique ID is 51 bits in size, the number n may be "3" (the unique ID is divided into three parts each 17 bits long). The block numbers A, B, . . . , n−1, n are a-bit information each.

The oscillation control section 40c also has the function of generating an error-detecting code for the receiving side to detect an error. ID block check bits, b bits, illustrated in FIG. 4B constitute a typical error-detecting code. In an embodiment, the error-detecting code is a parity code or a cyclic code, for example.

Figure 4B:
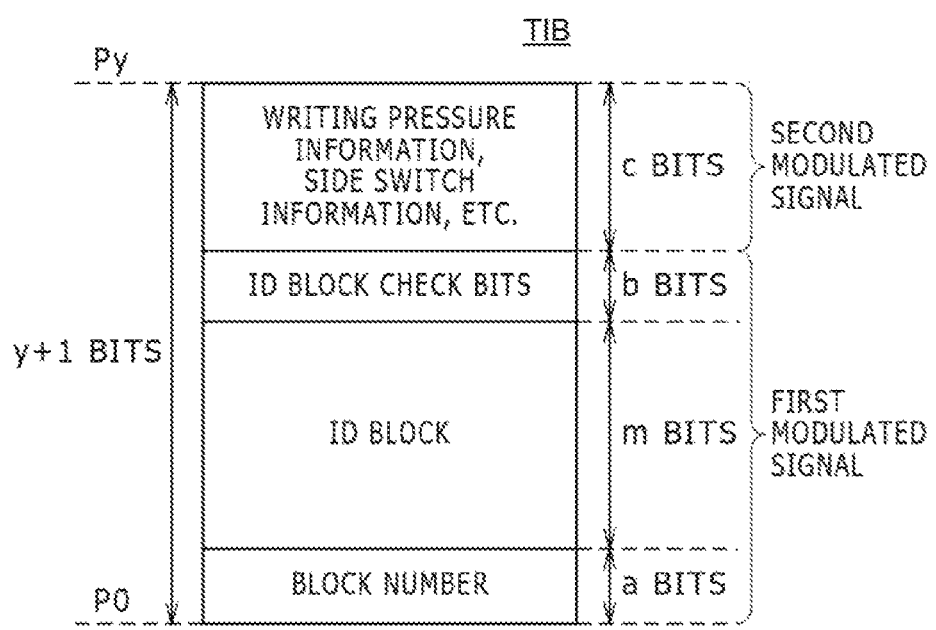
FIG. 4B is a schematic view illustrating an example structure of a transmission information block TIB generated by an oscillation control section 40c indicated in FIG. 2B.

The oscillation control section 40c generates the above-mentioned information part and error-detecting code every time a signal block is transmitted, in ascending order of the corresponding division numbers. Based on the generated information and on the latest second information, the oscillation control section 40c generates a transmission information block TIB to be included in each signal block. FIG. 4B illustrates an example of a transmission information block TIB thus generated.

The above-described points are reiterated below using the examples of FIGS. 4A and 4B. The oscillation control section 40c generates each ID block and the corresponding ID block check bits in the order of block numbers A, B, . . . , n−1, n. Every time an ID block is generated, the oscillation control section 40c generates a y+1-bit transmission information block TIB made up of bits P0 to Py together with the second information of c bits that includes the acquired information, the latest writing pressure information, the latest side switch information, and the latest charging request information.

Figure 5:
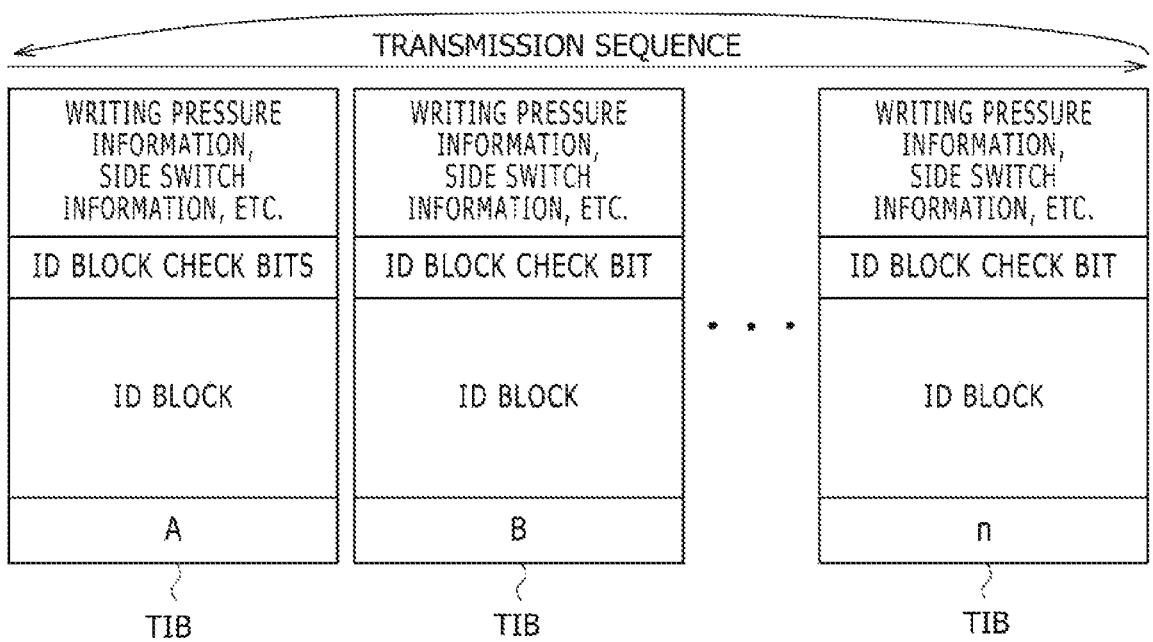
FIG. 5 is a schematic view illustrating the sequence in which a plurality of transmission information blocks TIB generated by the oscillation control section 40c indicated in FIG. 2B are transmitted in an embodiment.

FIG. 5 illustrates typical n transmission information blocks TIB generated successively as a result of the above-described process. Each of these n transmission information blocks TIB is associated with one of the division numbers (block numbers A, B, . . . , n−1, n). The transmission information blocks TIB are generated in the order of the division numbers. After completing the generation of the transmission information blocks TIB associated with all division numbers, the oscillation control section 40c returns to the smallest division number and repeats the same block generating process.

At the time of signal transmission, the oscillation control section 40c turns on the output of the oscillator 40d for a determined time period to transmit the continuous signal CS for position detection, as illustrated in FIG. 3A. The oscillation control section 40c then provides on-off control of the output of the oscillator 40d to transmit the start signal SS. Thereafter, the oscillation control section 40c provides on-off control of the output of the oscillator 40d on the basis of generated transmission information blocks TIB.

The signal blocks thus transmitted each constitute a signal made up of the continuous signal CS, start signal SS, and transmission information block TIB, as illustrated in FIG. 3A. The transmission information block TIB comprises a second modulated signal obtained by modulating the second information and by a first modulated signal acquired by modulating one of a plurality of divided information parts making up the first information, as illustrated in FIG. 4B.

As described above, every time a transmission information block TIB is generated, the oscillation control section 40c generates a signal block. On the basis of the signal blocks thus generated, the oscillation control section 40c provides on-off control of the output of the oscillator 40d. As a result of this process, the entire first information is eventually transmitted. The transmission operation performed by the electronic pen 20 takes place as described above.

Figure 6A:
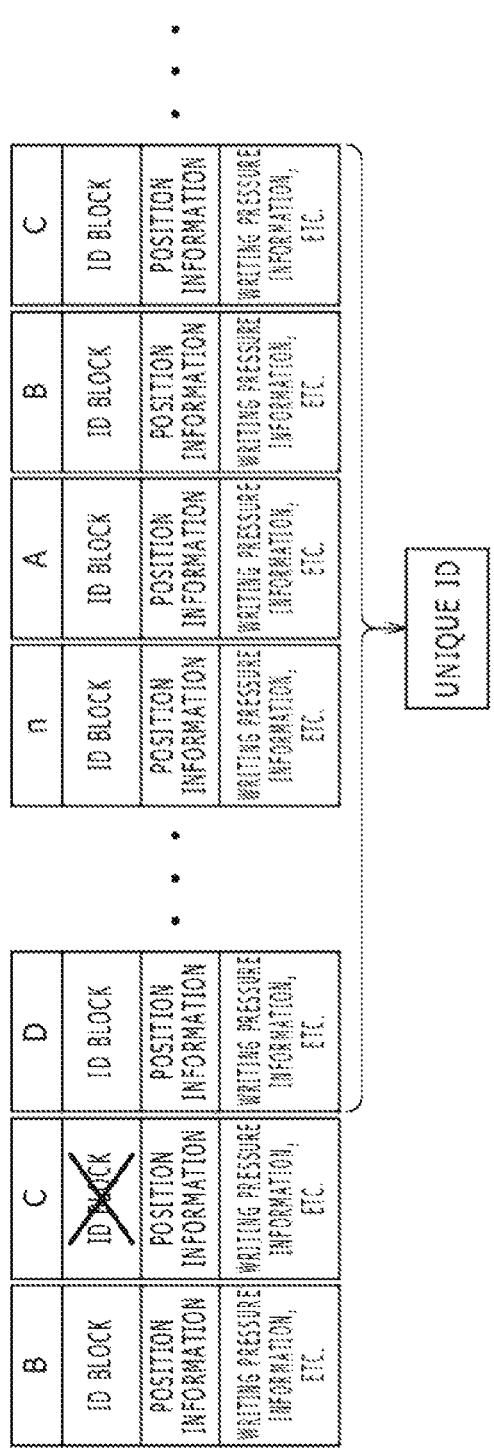
FIGS. 6A and 6B are explanatory views of example processing performed by the tablet 10 indicated in FIG. 1.
Figure 6B:
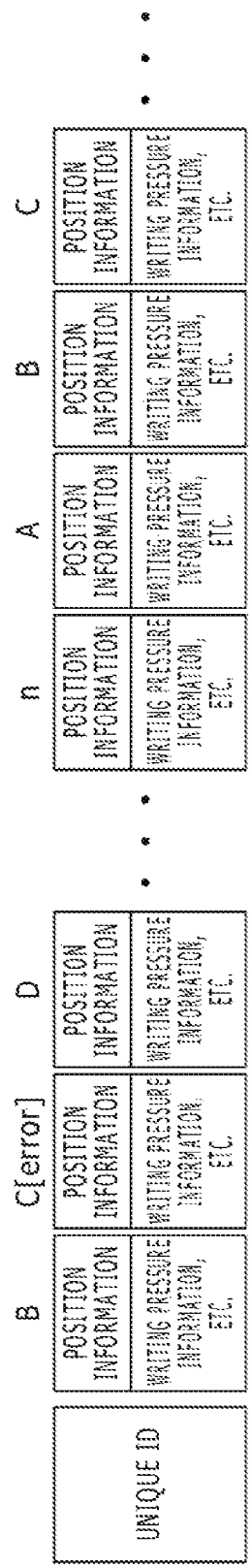

Described below in detail with reference to FIGS. 1, 3B and 6 is a series of example operations performed by the tablet 10 ranging from detection of the electronic pen 20 to receipt of the information sent from the electronic pen 20.

At a stage where the electronic pen 20 has yet to be detected, the microprocessor 18 of the tablet 10 repeats the operation of detecting a rise in the voltage of each of the electrodes 11X. Specifically, the microprocessor 18 monitors the digital signal S2 output from the analog-to-digital converter circuit 17 while causing the selection circuit 12 to select all electrodes 11X one by one. When detecting a voltage rise on one electrode 11X as a result of this operation, the microprocessor 18 proceeds to measure the voltage of each of the electrodes 11Y. Specifically, the microprocessor 18 monitors the digital signal S2 while causing the selection circuit 12 to select all electrodes 11Y one by one. When detecting a voltage rise on one electrode 11Y, the microprocessor 18 determines that the electronic pen 20 is approaching the point of intersection between that electrode 11Y and the electrode 11X on which the voltage rise was detected. If voltage rises are detected on a plurality of electrodes 11X or on a plurality of electrodes 11Y, the electronic pen 20 may be determined to be approaching one of the electrodes that bears the highest voltage.

In the example of FIG. 3B, the electrodes 11X are structured to include electrodes 11X9 to 11X13 arranged in the Y direction, and the electrodes 11Y are structured to include electrodes 11Y18 to 11Y22 arranged in the X direction. It is also illustrated that the electrode 11X on which the voltage rise was detected in the above process is the electrode 11X11, and that the electrode 11Y on which the voltage rise was detected is the electrode 11Y20. In the course of the ensuing description, the example in FIG. 3B will be referred to.

When it is determined that the electronic pen 20 is approaching the point of intersection between the electrode 11X11 and the electrode 11Y20, the microprocessor 18 causes the selection circuit 12 to select the electrode 11X11. In this state, the microprocessor 18, while monitoring the digital signal S2, waits for reception of the continuous signal CS supposed to be sent from the electronic pen 20.

When the electronic pen 20 starts transmitting the continuous signal CS, the voltage of the envelope signal S1 rises, as illustrated in FIG. 3B. As a result, the voltage value represented by the digital signal S2 also rises. Upon detecting this voltage rise, the microprocessor 18 determines whether or not that state continues for a determined time Ts. The determined time Ts is set to be longer than one cycle Td of the above-mentioned clock signal so that the signal of the transmission information block TIB will not be mistaken for the continuous signal CS.

If it is determined that the voltage rise has continued for the determined time Ts, the microprocessor 18 causes the selection circuit 12 to select the electrode 11X11 and a plurality of electrodes 11X nearby (five electrodes 11X9 to 11X13 in the example of FIG. 3B) one by one. From the digital signal S2, the microprocessor 18 acquires the voltage level of each of the selected electrodes. Of a plurality of voltage levels obtained as a result of such measurement, the highest voltage level is stored into the storage device 19 as a peak voltage VPX. The voltage levels of two adjacent electrodes 11X on both sides of the electrode 11X on which the peak voltage VPX was observed are stored into the storage device 19 as voltages VAX and VBX.

The microprocessor 18 then causes the selection circuit 12 to select the electrode 11Y20 and a plurality of electrodes 11Y nearby (five electrodes 11Y18 to Y22 in the example of FIG. 3B one by one. From the digital signal S2, the microprocessor 18 measures the voltage level of each of the selected electrodes. Of a plurality of voltage levels obtained as a result of such measurement, the highest voltage level is stored into the storage device 19 as a peak voltage VPY. The voltage levels of two adjacent electrodes 11Y on both sides of the electrode 11Y on which the peak voltage VPY was observed are stored into the storage device 19 as voltages VAY and VBY.

The microprocessor 18 is configured to perform the above-described voltage measuring operation for the duration of the continuous signal CS (e.g., the above-mentioned time period of 2.2 milliseconds). This is intended to suitably receive the start signal SS and the transmission information block TIB following the continuous signal CS. From an opposite point of view, the duration of the continuous signal CS for 2.2 milliseconds may be determined as a necessary and sufficient time period in which the microprocessor 18 completes the above-described voltage measuring operation.

The microprocessor 18 calculates the position information on the electronic pen 20 on the basis of the voltages stored into the storage device 19 as described above. For example, the voltages may be substituted into following mathematical expressions (1) and (2) to obtain coordinates (X, Y) as the position information on the electronic pen 20. In these expressions, $P_X$ stands for the X coordinate of the electrode 11X on which the peak voltage VPX was detected, $P_Y$ for the Y coordinate of the electrode 11Y on which the peak voltage VPY was detected, $D_X$ for the pitch at which the electrodes 11X are arranged, and $D_Y$ for the pitch at which the electrodes 11Y are arranged.

[Math. 1]

$$X = P_X + \frac{D_X}{2} \cdot \frac{VBX - VAX}{2 \cdot VPX - VAX - VBX} \quad (1)$$

$$X = P_Y + \frac{D_Y}{2} \cdot \frac{VBY - VAY}{2 \cdot VPY - VAY - VBY} \quad (2)$$

The microprocessor 18 then waits for reception of the start signal SS by monitoring the digital signal S2, while causing the selection circuit 12 to keep selecting the electrode 11X on which the peak voltage VPX was detected. When detecting the receipt of the start signal SS, the microprocessor 18 starts receiving the transmission information block TIB upon elapse of a determined time Tw from the time t1 at which the start signal SS was received. The transmission information block TIB is received as a sine wave signal modulated using binary ASK as described above. The sine wave signal is converted to the digital S2 typically by the analog-to-digital converter circuit 17 before being supplied to the microprocessor 18.

Described below in detail with reference to FIG. 6 is an example of the operation of the microprocessor 18 in connection with the process of receiving the transmission information block TIB.

Every time the continuous signal CS for position detection is received, the microprocessor 18 acquires the position information on the electronic pen 20 as described above, and stores the acquired position information into the storage device 19. Also, every time the transmission information block TIB including the second information and an information part of the first information is received, the microprocessor 18 acquires the second information and the information part from the block TIB and stores them into the storage device 19.

FIG. 6A schematically illustrates the items of information thus acquired. As illustrated in this figure, the tablet 10 receives a plurality of signal blocks in the order of the above-mentioned division numbers. It should be noted that the signal blocks may or may not be received in ascending order of the division numbers starting from the smallest division number. In the example of FIG. 6A, a block number B is received first, followed by block numbers C, . . . , n–1, n, A, B, C, . . . , in that order.

The microprocessor 18 continuously acquires the information parts from each of the successively received signal blocks. Upon completion of the acquisition of all information parts constituting the first information, the microprocessor 18 combines the acquired information parts based on the division numbers to obtain the first information.

Some information parts acquired by the microprocessor 18 may contain a bit error that occurred during the transmission. Every time an information part is acquired, the microprocessor 18 determines whether or not that information part is accurate (e.g., whether or not it includes any bit error) using the error-detecting code included in the same transmission information block TIB as the information part. If it is determined that the information part is not accurate, the microprocessor 18 does not use that information part for combination with the other information parts and defers executing the combining process until the signal block of the same division number is again received, while causing the storage device 19 to hold the second information and the position information. In this manner, the microprocessor 18 can acquire the first information free of error. FIG. 6A illustrates an example in which an error is detected in an ID block (illustrated crossed out) included in the signal block associated with the division number C received second. In this case, the microprocessor 18 waits for the signal block associated with the division number C to be again received, before combining the received information parts to acquire the first information.

Upon completion of the acquisition of the first information, the microprocessor 18 associates a plurality of pieces of position information and a plurality of pieces of second information held so far in the storage device 19 with the acquired first information. As needed, the microprocessor 18 associates each of the pieces of position information and each of the pieces of second information with the acquired first information before outputting them to the computer 30. This enables the microprocessor 18 and the computer 30 to process both the position information and the second information received up to the completion of the acquisition of the first information as the information associated with the first information.

Under the above scheme, the computer 30 cannot acquire the position information and the second information until the tablet 10 completes the acquisition of the first information. This can cause the user to experience delays in the processing of the computer 30, such as delayed display of the locus of the electronic pen 20. To bypass this phenomenon, the tablet 10 may output at least some information parts to the computer 30 without waiting for completion of the acquisition of the first information.

As a specific example, the microprocessor 18 may have a function of storing one or more first information parts acquired in the past. Until acquisition of the entire first information is completed, every time a new signal block is received, the microprocessor 18 may estimate the currently received first information part on the basis of the division numbers and ID blocks included in the signal blocks received so far and the first information stored in the past. Even before acquisition of the first information as a whole is completed, the microprocessor 18 may associate the successively received position information and second information with the estimated first information and output the combined information successively to the computer 30.

For example, it may happen that the electronic pen 20 enters a detectable area of the tablet sensor 11 but immediately leaves it so that acquisition of the first information is incomplete. In that case, the example function above enables the computer 30 to process the position information, writing pressure information, and other information by use of the estimated first information. This makes it possible to display the locus of the electronic pen 20 even if the first information (unique ID) cannot be recognized due to excessively rapid "in-and-out movements" of the electronic pen 20.

As a more specific example, suppose that, of the transmission information blocks TIB illustrated in FIG. 6A, only two transmission information blocks TIB associated with the division numbers A and B are acquired as a result of rapid "in-and-out movements" of the electronic pen 20. In this case, if the microprocessor 18 has acquired and stored the associated first information in the past, the microprocessor 18 may compare the ID blocks included in the two transmission information blocks TIB with the stored first information (unique ID). This allows the microprocessor 18 to estimate the entire first information including the ID blocks associated with the division numbers C to n. That in turn enables the computer 30 to process the position information, writing pressure information, and other information acquired from the two transmission information blocks TIB as the information on the electronic pen 20 having the estimated first information.

As described above, the input system 1 of this embodiment divides the first information, which is too large to be transmitted in one transmission information block TIB, into a plurality of signal blocks each including the continuous signal CS for position detection before transmitting the signal blocks. This makes it possible for the electronic pen 20 to transmit large-size information to the tablet 10 without reducing the sampling rate of the position information.

Because the division number is assigned to each signal block, the tablet 10 can correctly restore the first information on the basis of the division numbers. Since the error-detecting code is attached to each signal block, it is also possible to prevent the restoration of the first information based on an erroneous information part.

The tablet 10 retains in the storage device 19 the received second information as well as the position information obtained before acquisition of the first information is completed. It follows that upon completion of the acquisition of the first information, the tablet 10 can make effective use of such retained information as the information associated with the first information.

Although example embodiments have been described above, this is not limitative. It is evident that embodiments can be implemented in diverse forms within the scope and spirit thereof.

For example, although the input system 1 explained in conjunction with the above embodiments is configured to perform position detection and communication by use of a self-capacitance type touch-sensitive panel, embodiments can also be adapted advantageously to other types of systems. For example, embodiments may be adapted to a mutual capacitance type touch panel or to an input system that performs position detection and communication using the electromagnetic induction scheme.

Figure 7:
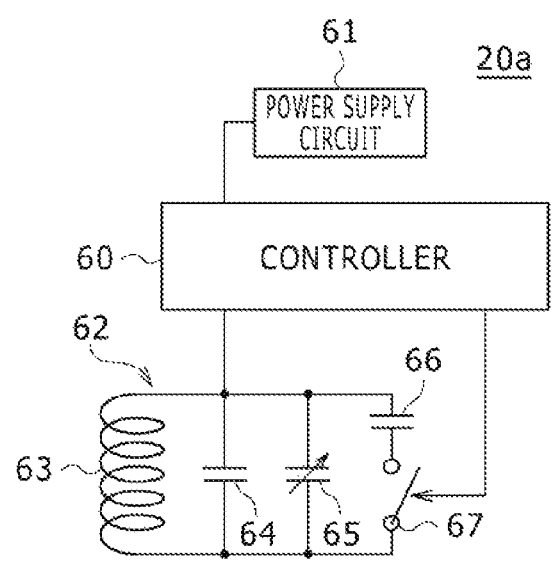
FIG. 7 is a circuit diagram illustrating an internal circuit of a variation of the electronic pen 20 according to an embodiment.

FIG. 7 illustrates a structure of an electronic pen 20a for use with an input system that performs position detection and communication using the electromagnetic induction scheme. As illustrated in the figure, the electronic pen 20a is configured to have a controller 60, a power supply circuit 61, and a resonant circuit 62. The resonant circuit 62 is made up of a coil 63, a capacitor 64, and a variable capacitance capacitor 65. The capacitor 64 and the variable capacitance capacitor 65 are connected in parallel to the coil 63. A capacitor 66 is further connected to the resonant circuit 62 via a switch 67.

The resonant circuit 62 is configured to resonate with electromagnetic waves of a determined frequency transmitted from a position detecting device (tablet). The controller 60 is configured to transmit a signal using induced power generated by resonance. That signal may be structured in the same manner as the signal blocks used by the above-described embodiment. Thus the input system that performs position detection and communication using the electromagnetic induction scheme may, as with the input system 1 of the above-described embodiment, transmit large-size information from the position indicator to the position detecting device without reducing the sampling rate of the position information.

Although it was explained that the above embodiment transmits both the first and the second information in each signal block, it is not mandatory to transmit the second information. Embodiments may thus be adapted advantageously to electronic pens that do not transmit the second information.

It was also explained in conjunction with the above embodiment that the transmission information blocks TIB are sent as an intermittent signal including, at intervals of a determined time period (specifically one clock cycle), a time period during which each transmission information block TIB is at the low level and that the continuous signal CS remains at the high level over a period longer than the determined time period. Alternatively, the transmission information blocks TIB may be sent as an intermittent signal including a time period during which each transmission information block TIB is at the high level, with the continuous signal CS remaining at the low level over a time period longer than the determined time period.

It was further explained in conjunction with the above embodiment that as illustrated in FIG. 3A, the entire continuous signal CS for use in detecting the position of the position indicator is transmitted in one pass. Alternatively, the continuous signal CS may be transmitted in a plurality of divided parts.

DESCRIPTION OF REFERENCE SYMBOLS

1 Input system
10 Tablet
11 Tablet sensor
11X, 11Y Electrode
12 Selection circuit
13 Amplifier circuit
14 Band-pass filter
15 Detector circuit
16 Sample hold circuit
17 Analog-to-digital converter circuit
18 Microprocessor
19 Storage device
20 Electronic pen
30 Computer
40 Controller
40a Unique ID storage section
40b Information acquisition section
40c Oscillation control section
40d Oscillator
41 Voltage converter circuit
42 Diode
43 to 46, 64 to 66 Capacitor
47 Resistive element
48, 49, 67 Switch
50 Vibrator
51 Conductor core
52 Tip conductor
53 Charging terminal
60 Controller
61 Power supply circuit
62 Resonant circuit
63 Coil
CS Continuous signal
P1 to P6 Control terminal
S1 Envelope signal
S2 Digital signal
TIB Transmission information block
SS Start signal The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A signal transmission method, comprising:
dividing, by a position indicator, first information, which is a digital signal of a first defined number of bits, into a plurality of information parts as digital signals of a second defined number of bits smaller than the first defined number of bits; and transmitting, from the position indicator to a position detecting device, the information parts, and distinguishing information usable for distinguishing the information parts from each other, wherein each of the information parts is transmitted with second information different from the first information.

2. The signal transmission method according to claim 1, wherein the distinguishing information is usable for reconstructing the first information.

3. The signal transmission method according to claim 1, comprising transmitting, from the position indicator to the position detecting device, an error detection code usable for detection of an error in the information parts.

4. The signal transmission method according to claim 1, wherein the first information is information unique to the position indicator.

5. The signal transmission method according to claim 4, wherein the information unique to the position indicator is at least one of ID information that identifies the position indicator, user ID information assigned to the position indicator, or manufacturer information of the position indicator.

6. The signal transmission method according to claim 1, wherein the second information is pressure information detected by the position indicator.

7. The signal transmission method according to claim 6, wherein the pressure information is pen tip pressure information of the position indicator.

8. A signal transmission method, comprising:
dividing, by a position indicator, first information, which is a digital signal of a first defined number of bits, into a plurality of information parts as digital signals of a second defined number of bits smaller than the first defined number of bits; and transmitting, from the position indicator to a position detecting device, the information parts, and distinguishing information usable for distinguishing the information parts from each other.

9. The signal transmission method according to claim 8, wherein the distinguishing information is usable for reconstructing the first information.

10. The signal transmission method according to claim 8, comprising transmitting, from the position indicator to the position detecting device, an error detection code usable for detection of an error in the information parts.

11. The signal transmission method according to claim 8, wherein the first information is information unique to the position indicator.

12. The signal transmission method according to claim 11, wherein the information unique to the position indicator is at least one of ID information that identifies the position indicator, user ID information assigned to the position indicator, or manufacturer information of the position indicator.

13. The signal transmission method according to claim 8, comprising transmitting, from the position indicator to the position detecting device, second information different from the first information with each of the information parts, wherein the second information is pressure information detected by the position indicator.

14. The signal transmission method according to claim 13, wherein the pressure information is pen tip pressure information of the position indicator.

15. A signal transmission method, comprising:
dividing, by a position indicator, first information, which is a digital signal of a first defined number of bits, into a plurality of information parts as digital signals of a second defined number of bits smaller than the first defined number of bits; and transmitting, from the position indicator to a position detecting device, the information parts, and an error detection code usable for detection of an error in the information parts.

16. The signal transmission method according to claim 15, comprising transmitting, from the position indicator to the position detecting device, distinguishing information usable for distinguishing the information parts from each other and usable for reconstructing the first information.

17. The signal transmission method according to claim 15, comprising transmitting, from the position indicator to the position detecting device, second information different from the first information with each of the information parts.

18. The signal transmission method according to claim 15, wherein the first information is information unique to the position indicator.

19. The signal transmission method according to claim 18, wherein the information unique to the position indicator is at least one of ID information that identifies the position indicator, user ID information assigned to the position indicator, or manufacturer information of the position indicator.

20. The signal transmission method according to claim 15, comprising transmitting, from the position indicator to the position detecting device, second information different from the first information with each of the information parts, wherein the second information is pressure information detected by the position indicator.

21. The signal transmission method according to claim 20, wherein the pressure information is pen tip pressure information of the position indicator.

* * * * *